Patented Dec. 5, 1939

2,182,208

UNITED STATES PATENT OFFICE 2,182,208

SILICON MODIFIED PHENOLIC RESINS AND PROCESS FOR PRODUCING SAME

Howard K. Nason, St. Louis, Mo., assignor to Anderson-Stolz Corporation, Kansas City, Mo., a corporation of Missouri No Drawing. Application June 9, 1937, Serial No. 147,379

15 Claims. (Cl. 260—19)

This invention relates to silicon modified phenolic resins and a process for producing same, and more particularly to the production of phenolic resins containing silicon in chemical combination.

It is known that silicon esters of simple phenols may be prepared by ester interchange from phenols and alkyl silicates. The same products may be obtained by the reaction of the phenols and silicon tetrahalide or substituted silicon halide. To my knowledge, however, these reactions have never been applied to complex phenolic resins having one or more free hydroxyl groups per molecule.

I have discovered that such reactions can be made to take place and that the products thereof possess properties which render them useful in the arts. These products are resinous bodies, chemically inert, and capable of formulation into protective coatings of great durability. Other uses for such resins have been investigated and are discussed below.

The principal object of this invention is the preparation of synthetic resins of the phenolic type in which silicon is chemically combined.

A further object of the present invention is the preparation of coating, molding, impregnating, and bonding compositions containing these resins.

In carrying out my invention, I hereinafter present hypotheses which I believe reasonably explain the nature of the reactions involved in the invention and which will be apparent from a study of the type equations representing the chemical transformations effected, which follow the hypotheses:

1. Reaction is more rapid in the case of "novalac" type resins which are believed to contain many free hydroxyl groups, and less rapid in the case of more highly condensed products. In the case of the hard, infusible molding type resins, no appreciable reaction takes place at all.

2. Silicon tetrachloride reacts more rapidly than ethyl silicate. It is known to be quite reactive with hydroxyl groups.

3. When ethyl silicate is used as the source of silicon, alcohol is obtained from the reaction. This implies reaction with a hydroxyl group.

For example, certain ester interchanges between complex groupings of phenolic resins and certain silicon compounds are indicated by the following equated structural and reaction schemes:

I. From alkyl (ethyl) orthosilicate:

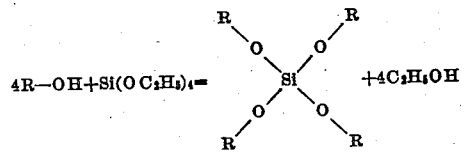

II. From silicon tetrahalide (chloride)

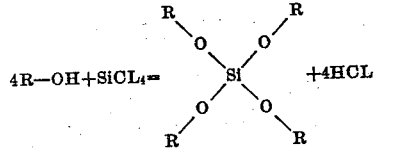

III. From substituted silicon halide:

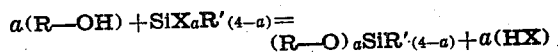

where "R" represents the complex grouping of the phenolic resin whose terminal grouping is "—OH", "X" represents a halide atom, "R'" represents an alkyl or aryl substituent, and "a" represents the number of halide atoms present.

The reactions shown above are given as examples of the general types only, and that many modifications may be made is obvious. The products shown are the simplest which could be obtained.

It is realized that most of the phenolic materials used may have more than one free hydroxyl group, in which case the complexity and size of the resulting molecule may be greatly increased. It is undesirable that the molecule size should be excessive as the larger molecules are less reactive with oils and less soluble in solvents. At the same time, too small a molecule will not possess sufficient chemical resistance to form good protective coatings. The correct type of product must be obtained by careful regulation of reaction conditions and by the incorporation of suitable modifying agents.

The characteristics of the product may be varied over a wide range by the selection of the type of phenolic resin used as a raw material, by varying the reaction conditions, by the use of different substituent groups in the silicon halide of Reaction III, by the incorporation of modifying agents in the reaction mixture, and by the use of various alkyl silicates in Reaction I. The modifying agents used in the reaction mixture may be ones which will react chemically either with the phenolic base, with the silicon compound, or with both; or they may be ones which influence the physical properties of the product without themselves being chemically combined. Drying, semi-drying and non-drying preferably vegetable oils may be mentioned as examples of the first type of modifying agents. Plasticizers, as for example dibutyl phthalate, and similar materials may be mentioned as examples of the non-reactive modifying agents.

A satisfactory method of preparing these products comprises heating a mixture of a phenolic resin, a silicon compound, a modifying agent and a solvent (if desired) together at a temperature slightly above the boiling point of the silicon compound and at atmospheric pressure, the vaporized materials being returned to the reaction mixture by reflux condensers. The temperature of these condensers may be so regulated that all of the unreacted silicon compound is returned to the mixture while reaction products, as, for example, hydrogen chloride or alcohol, are allowed to pass off to be recovered subsequently or discarded as desired. In reactions where alcohols are the only products, the reflux temperature may be so adjusted that these are all returned and utilized as solvents for the finished resin.

The character of the reaction and products may be varied by conducting the reaction under higher than atmospheric pressure, for example fifteen to one hundred pounds per square inch, and under proportionately higher temperatures. Further modification in the physical and chemical properties of the product may be obtained by increasing the temperature after the reaction with silicon compound is complete and by controlled heat treatment for any desired period of time. Other modifying agents, solvents, fillers, and the like, may be added during or at the end of this period as indicated.

By proper selection of materials and reaction conditions, products of various degrees of solubility in organic solvents, oils, and reagents may be obtained. Other physical properties such as hardness, elasticity, and the like, may be similarly varied. The products which have been prepared in this way vary from soft, semi-fluid masses to hard, brittle resins almost totally insoluble in oils, and solvents.

An optional method of preparation of compounds of this type comprises heating together phenol, an aldehyde, a silicon ester or an halide, and modifying agents. In this case, reaction, condensation and polymerization take place within the system. Care must be exercised to prevent hydrolysis of the silicon ester or halide by the water evolved during the reaction. The water should be removed as rapidly as formed by suitable means, as for example, by boiling benzene.

These products are of unusual interest to the arts because of their unusual resistance to chemical reagents such as strong acids and alkalies which readily attack and destroy ordinary resins, and because of increased moisture resistance, fire and heat resistance and general chemical stability. When modified with a drying oil they are usually soluble in aromatic hydrocarbons, and partially, if not completely, soluble in aliphatic hydrocarbons. On evaporation of the solvent and gentle oxidation, they become insoluble in most organic solvents, and hence form very resistant coatings. In many cases these coatings also possess a water resistance unequaled by any other organic coating.

By proper selection of raw material with regard to purity and stability, and by careful control of reaction conditions, avoiding excessive heat and contact with easily corrodible metals, products may be prepared of very pale color and which are compatible with various natural and synthetic resins, cellulose esters and ethers, drying oils, rubber and chlorinated rubber, and with the usual plasticizers and lacquer solvents.

Such products are especially valuable in the formulation of high-integrity lacquers and finishes where unusual durability is required. Such finishes are especially valuable for application on chemical tanks, water storage vessels, structures exposed to sea water and other places where severe chemical attack limits severely the life of the protective coatings now commercially available.

The following examples serve to illustrate methods of carrying out the invention, but are not to be regarded as limiting its scope:

Example 1

100 grams of a resin obtained by reacting para tertiary butyl phenol and formaldehyde, 50 grams benzene, and 25 grams tetra-ethyl orthosilicate were heated in a vessel equipped with an efficient reflux condenser until a rapid rate of reflux was obtained. The mixture was refluxed for about one hour, when the reaction was practically complete. The benzene and the alcohol produced by the reaction were distilled off at reduced pressure (50 mm. mercury). The residue was a pale yellow brittle resin, soluble in hot benzene and hot oils, but nearly insoluble in alcohols.

Example 2

30 grams of the resin obtained in Example 1 were heated with an equal weight of pure tung oil for about 30 minutes at approximately 180° C., cooled and thinned with 60 grams of a mixture containing 30% xylol and 70% heavy petroleum naphtha. The varnish so produced dried quickly to a hard, tough, pale yellow film possessing unusual resistance to acids, alkalies, water, alcohols, light and abrasion. The hardness is improved slightly by incorporating about 0.025% lead naphthenate (as lead) just after thinning. This also slightly decreases drying time. Cobalt and manganese naphthenates may also be used, but with different proportions and slightly different effects.

Example 3

100 grams of the above varnish were mixed with 25 grams of finely powdered aluminium. The resulting mixture when applied to clean iron panels dried rapidly to give a brilliant metallic finish of unusual durability and moisture resistance. This finish, when properly applied and aged, was unaffected by continuous immersion in boiling water for 200 hours. Commercial coatings failed in a few hours under this severe test. Pigments other than aluminium, when properly incorporated in ways well known to those versed in the art, gave similarly superior results.

The choice of pigments suitable for use is wide and is limited by the chemical resistance of the pigments rather than by compatibility with the varnish. Nearly all of the commercially available pigments can be successfully incorporated. For a chemically resistant film, however, the choice of pigments is limited rather severely to those which are inert. Silica, carbon-black and graphite, titanium oxide, and some earth colors are examples of resistant pigments which have been found suitable. Non-resistant pigments may be used if the coating is finished with one or more applications of clear unpigmented varnish. A very clear and light colored coating must be used for this sealing coat or the brilliance and color of the finish will be impaired.

*Example 4*

100 grams of a resin obtained by reacting para cresol and formaldehyde, 50 grams of benzene and 20 grams of silicon tetrachloride were agitated together at 10° C. for 36 hours, the hydrogen chloride evolved being drawn off. The temperature was then slowly raised and held at 100° by a bath of boiling water until all of the benzene, containing a small amount of unreacted silicon tetrachloride and hydrogen chloride, had distilled off. The product was a dark amber resin which was formulated into varnishes in a manner similar to that of Example No. 2.

*Example 5*

80 grams of a resin obtained by reacting para iso-amyl phenol and formaldehyde, 35 grams of castor oil and 12 grams of tetra-ethyl orthosilicate were heated at gentle refluxing temperature (about 165-170° C.) for about 20 hours. A thick viscous solution of resin in alcohol was obtained. This possesses valuable properties when spread to a thin film, although it dries very slowly. It was found to be compatible with various cellulose esters and ethers, particularly cellulose nitrate, ethyl cellulose and benzyl cellulose, and imparted valuable properties to lacquers made from these materials. In the case of nitrocellulose lacquers, fire resistance was greatly improved, adhesion improved, tensile strength increased, and moisture permeability decreased. When the resin is incorporated with an auxiliary plasticizer, such as methyl phthalyl ethyl glycollate, good films can be prepared with cellulose acetate which combine good flexibility, chemical resistance and satisfactory adhesion.

*Example 6*

10 grams of the resin of Example 5, 20 grams chlorinated rubber, 5 grams dibutyl phthalate, and 65 grams of xylol were mixed until a clear solution resulted. When this lacquer was applied to clean iron panels, a tough, resilient film was formed which possessed unusual resistance to acids and alkalies, petroleum solvents, and good moisture resistance. Such a film, pigmented with 20% finely powdered aluminium resisted the action of a sour gasoline, to which had been added 0.15% ethyl mercaptan, for over a year. Ordinary coatings, represented as resistant to petroleum solvents failed in a week in this test.

These silicon resins, or their solutions in organic solvents, may be used as impregnating and bonding agents. In bonding plywoods, for example, they give a product of great strength and unusual resistance to moisture, decay and weathering.

When mixed with suitable fillers and pigments, these resins may be used in molding compositions, yielding molded products of great density, mechanical strength and chemical resistance.

Specific mention of the general term "phenol" is intended, as disclosed in the examples herein given, to include allied substances, such as "cresol" and the like.

Many other applications of these resins will suggest themselves to those skilled in the arts, and, as many such applications may be made without departing from the spirit of the invention, it is to be understood that I do not limit myself to the specific embodiments thereof except as defined in the following claims.

What I claim and desire to secure by Letters Patent is:

1. The synthetic resin which is the reaction product of constituents consisting essentially of the following reactants: para-tertiary-butyl-phenol, formaldehyde, and tetra-ethyl-orthosilicate.

2. The modified phenolic resin which is the reaction product of constituents consisting essentially of the following reactants: para-tertiary-butyl-phenol, formaldehyde, tetra-ethyl-orthosilicate, and a vegetable oil.

3. The synthetic resin which is the reaction product of constituents consisting essentially of the following reactants: para-iso-amyl-phenol, formaldehyde, and tetra-ethyl-orthosilicate.

4. The synthetic resin which is the reaction product of constituents consisting essentially of the following reactants: para-cresol, formaldehyde, and a silicon tetrahalide.

5. The silicon modified phenolic resin which is the reaction product of constituents consisting essentially of a material selected from the group of phenols consisting of para-tertiary-butyl-phenol, para-isoamylphenol and para-cresol; formaldehyde; and of a material selected from the group of silicon compounds consisting of alkyl ortho-silicate, a silicon tetrahalide, an alkyl substituted silicon halide, and an aryl substituted silicon halide.

6. The silicon modified phenolic resin which is the reaction product of constituents consisting essentially of a material selected from the group of phenols consisting of para-tertiary-butyl-phenol, para-isoamylphenol and para-cresol; formaldehyde; of a material selected from the group of silicon compounds consisting of alkyl ortho-silicate, a silicon tetrahalide, an alkyl substituted silicon halide, and an aryl substituted silicon halide; and a vegetable oil.

7. The silicon modified phenolic resin which is the reaction product of constituents consisting essentially of a material selected from the group of phenols consisting of para-tertiary-butyl-phenol, para-isoamylphenol and para-cresol; formaldehyde; and a silicon halide.

8. The silicon modified phenolic resin which is the reaction product of constituents consisting essentially of a material selected from the group of phenols consisting of para-tertiary-butylphenol, para-isoamylphenol and para-cresol; formaldehyde; and alkyl ortho-silicate.

9. The silicon modified phenolic resin which is the reaction product of constituents consisting essentially of a material selected from the group of phenols consisting of para-tertiary-butyl-phenol, para-isoamylphenol and para-cresol; formaldehyde; alkyl ortho-silicate; and a vegetable oil.

10. The silicon modified phenolic resin which is the reaction product of constituents consisting essentially of a material selected from the group of phenols consisting of para-tertiary-butylphenol, para-isoamylphenol and para-cresol; formaldehyde; and tetra-ethyl-orthosilicate.

11. The silicon modified phenolic resin which is the reaction product of constituents consisting essentially of a material selected from the group of phenols consisting of para-tertiary-butylphenol, para-isoamylphenol and para-cresol; formaldehyde; tetra-ethyl-orthosilicate; and a vegetble oil.

12. The silicon modified phenolic resin which is the reaction product of constituents consisting essentially of a material selected from the group of phenols consisting of para-tertiary-butylphenol, para-isoamylphenol and para-cresol; formaldehyde; and a silicon tetrahalide.

13. The silicon modified phenolic resin which is the reaction product of constituents consisting essentially of a material selected from the group of phenols consisting of para-tertiary-butylphenol, para-isoamylphenol and para-cresol; formaldehyde; a silicon tetrahalide; and a vegetable oil.

14. The silicon modified phenolic resin which is the reaction product of constituents consisting essentially of a material selected from the group of phenols consisting of para-tertiary-butylphenol, para-isoamylphenol and para-cresol; formaldehyde; and an alkyl substituted silicon halide.

15. The silicon modified phenolic resin which is the reaction product of constitutents consisting essentially of a material selected from the group of phenols consisting of para-tertiary-butylphenol, para-isoamylphenol and para-cresol; formaldehyde; an alkyl substituted silicon halide; and a vegetable oil.

HOWARD K. NASON.